United States Patent [19]

McKillip et al.

[11] 3,872,762

[45] Mar. 25, 1975

[54] BAND SAW SYSTEM

[75] Inventors: William R. McKillip, Portland, Oreg.; Donald L. Mason, Fair Oaks, Calif.

[73] Assignee: R. Hoe & Co., Inc., Portland, Oreg.

[22] Filed: Sept. 4, 1973

[21] Appl. No.: 394,087

[52] U.S. Cl. ............................... 83/820, 83/829
[51] Int. Cl. ............................................ B26d 1/54
[58] Field of Search .............. 83/820, 829, 821, 823

[56] References Cited
UNITED STATES PATENTS
1,642,838   9/1927   Causey.................................. 83/823
FOREIGN PATENTS OR APPLICATIONS
115,330   5/1918   United Kingdom................... 83/823

*Primary Examiner*—Willie G. Abercrombie
*Attorney, Agent, or Firm*—Klarquist, Sparkman, Campbell, Leigh, Hall & Whinston

[57] ABSTRACT

A band saw has top and bottom guides both pressing a sawing section of a saw band out beyond a line tangent to top and bottom wheels of the band saw. The guides include holders having sockets into which guide blocks are inserted, and adjustment screws on the guide blocks abut adjustment screws on the guides to precisely locate guide faces of the guide blocks. A milling machine has a holder for receiving one of the guide blocks in a position engaging the adjustment screws of that guide block, and mills the guide face a predetermined distance from the adjustment screws. A quality control jig receives the guide block and indicates when the guide face is the desired distance from the adjustment screws.

3 Claims, 9 Drawing Figures

PATENTED MAR 25 1975 3,872,762
SHEET 1 OF 2
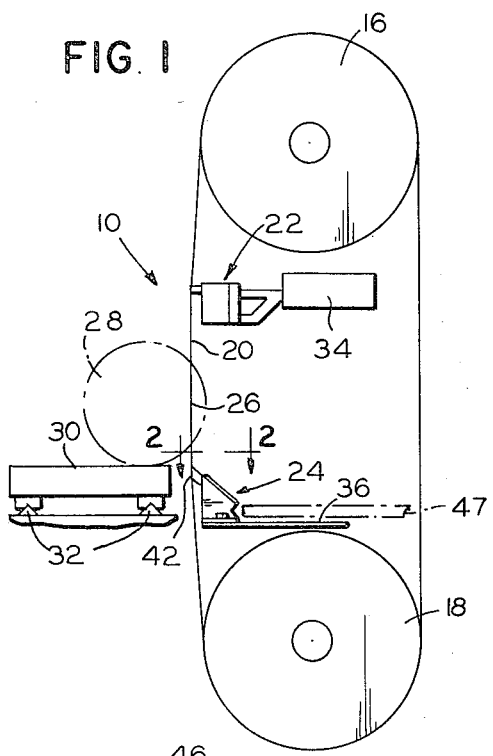
FIG. 1
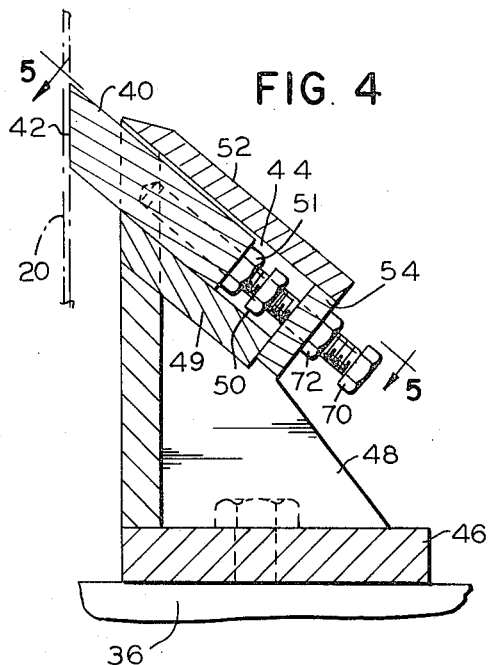
FIG. 4
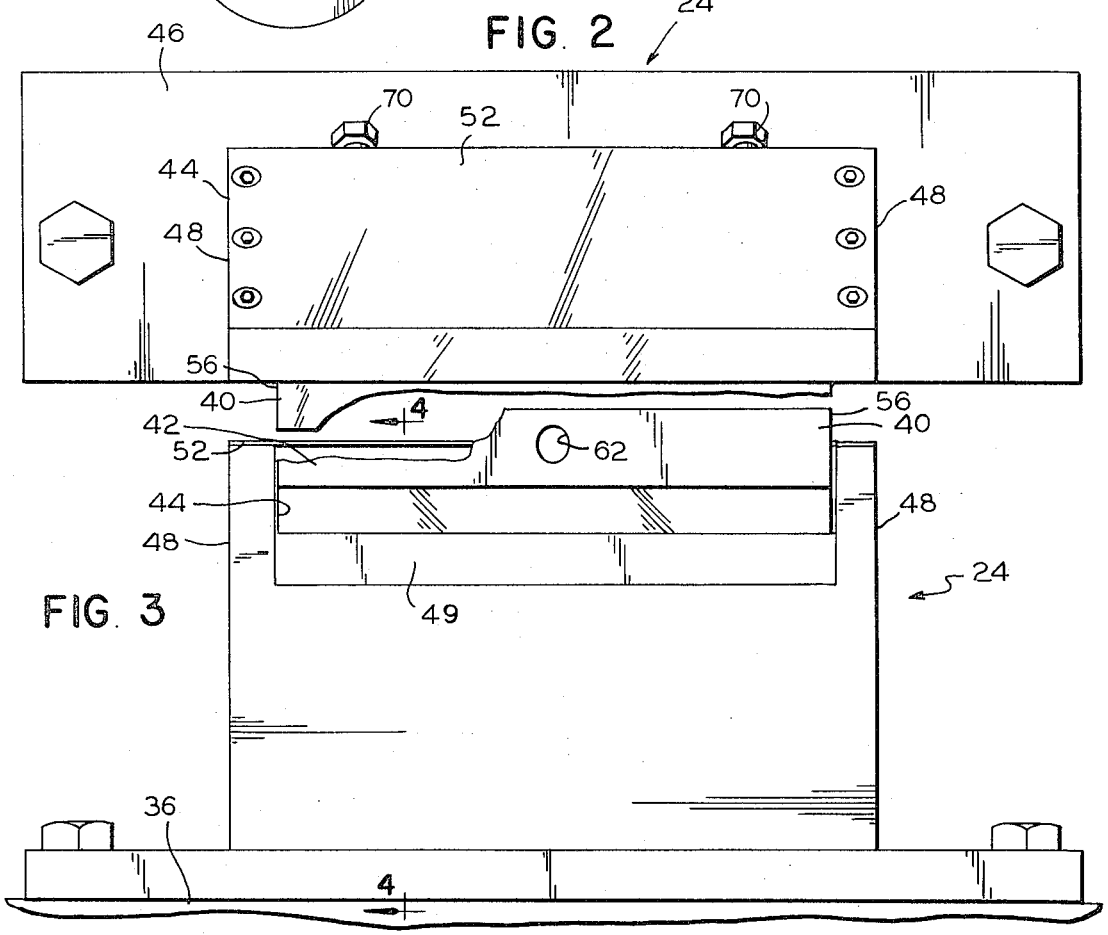
FIG. 2
FIG. 3

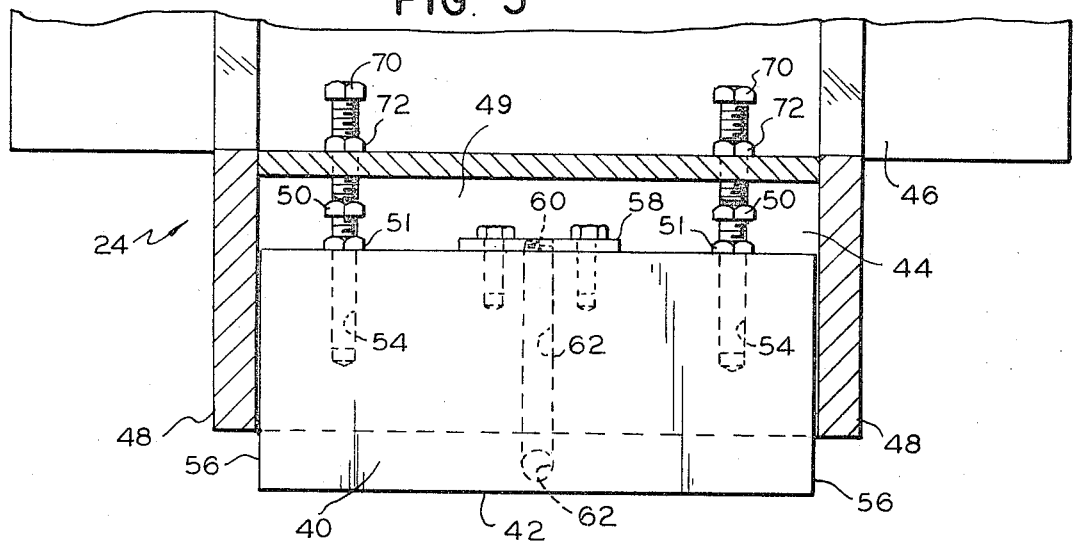
FIG. 5
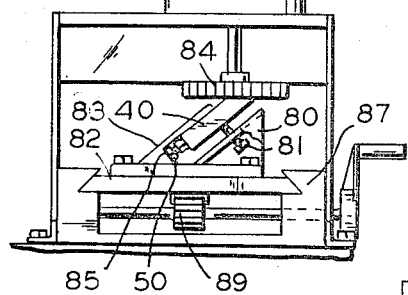
FIG. 7
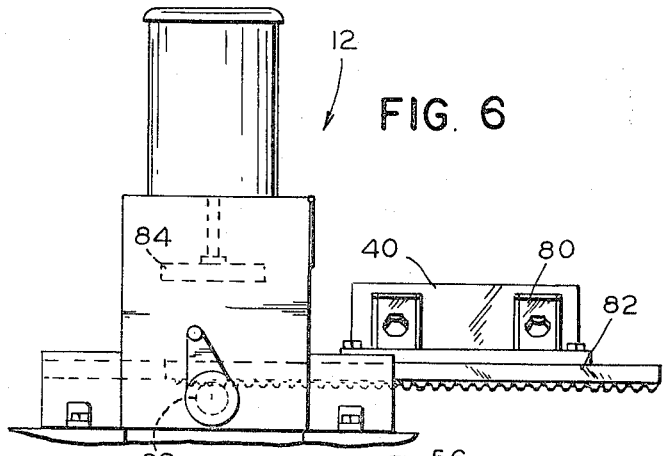
FIG. 6
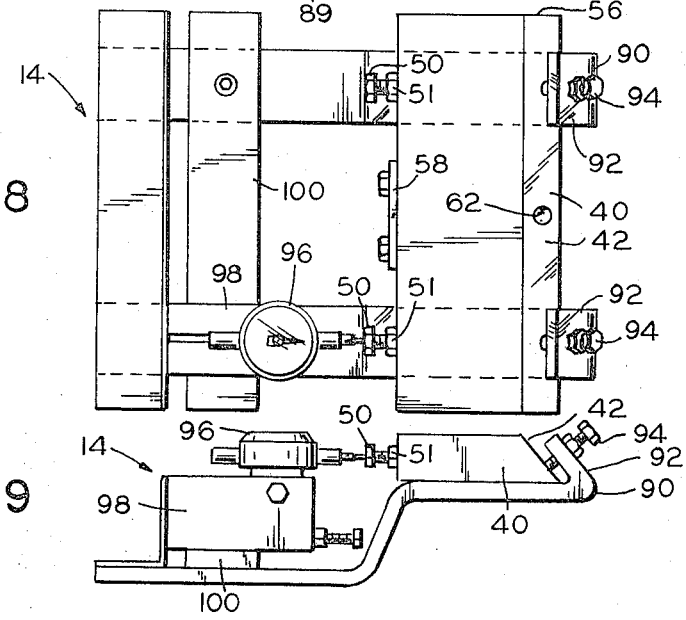
FIG. 8
FIG. 9

BAND SAW SYSTEM

DESCRIPTION

This invention relates to a band saw system, and has for an object thereof the provision of a very precise band saw system.

Another object of the invention is to provide new and improved band saw guides wherein a single guide block having a pair of adjustment screws is slidable into and out of a guide holder having adjustable locating members for engaging the adjustment screws.

A further object of the invention is to provide a band saw including top and bottom guides both pressing a saw band out beyond a line tangent to top and bottom wheels.

Another object of the invention is to provide a new and improved guide block surfacer.

Another object of the invention is to provide a precise measuring device for a band saw guide block.

In the drawings;

FIG. 1 is a side elevation view of a band saw forming a portion of a band saw system forming one embodiment of the invention;

FIG. 2 is an enlarged plan view of a guide block taken on line 2—2 of FIG. 1;

FIG. 3 is a front elevational view of the guide block shown in FIG. 2;

FIG. 4 is a sectional view taken on line 4—4 of FIG. 3;

FIG. 5 is a plan sectional view taken on line 5—5 of FIG. 4;

FIG. 6 is a side elevational view of a guide block surfacing machine;

FIG. 7 is an end elevational view of FIG. 6;

FIG. 8 is a plan view of the quality control jig; and

FIG. 9 is a side elevational view of FIG. 8.

Referring now in detail to the drawings, there is shown therein a band saw system forming one specific embodiment of the invention and including a headrig band saw 10, (FIG. 1), a guide block surfacer 12, (FIG. 6), and a precise guide block dimension tester 14 (FIG. 8). The band saw includes a top wheel 16, (FIG. 1), a bottom or drive wheel 18, a saw band 20, a top guide 22 and a bottom guide 24. The guides 22 and 24 both push the saw band about three-eighths of an inch out to the left as viewed in FIG. 1, of an imaginary line tangent to the extreme lefthand points on the peripheries of the top and bottom wheels, and tension a cutting portion 26 of the saw band between the saw guides. This relative location of the guides and the wheels is effected by adjusting the wheels by well known conventional adjusting mechanisms (not shown). This offset position of the lower guide has reduced deviation in the kerf from 0.087 inches to 0.017 inches, a savings of 0.070 inches. A log 28 to be sawed is moved by a conventional headrig carriage 30 movable along guides 32.

The top guide 22 is mounted horizontally on a frame portion 34 of the band saw and the bottom guide 24 is bolted on a frame portion 36 of the band saw and is upwardly inclined at 50° to the vertical. Except for this difference in inclination of the saw guides, the saw guides are substantially alike and only the saw guide 24 will be described in detail. The saw guide 24 includes a single, one-piece guide block 40 having a vertical contact face 42, and is slidable into and out of a holder or socket 44 having a base 46 bolted to the frame portion 36. The holder 44 includes vertical end walls 48, an inclined bottom side wall 49 integral with the end walls 48, an inclined top side wall 52 bolted to the end walls, and a bottom plate 54 fixed to the end walls. The top portion of the guide 24 slopes downwardly to an off-bearing conveyor 47 to help guide each cant cut from the log onto the offbearing conveyor 47, as best shown in FIG. 1.

The guide block 40 is composed of a suitable, well known saw guide material, such as, for example, Gelleran, lignum vitae, Ryertex, or similar material, and two adjustment screws 50 having jam nuts 51 are screwed part way into tapped bores 53, which are parallel to parallel end faces 56 lying in planes perpendicular to the plane of the guide face 42. The guide block fits slightly loosely and slidable in the holder 44 and has a metal bar 58 bolted to the bottom edge thereof with a tapped bore 60 through the bar 58 aligned with a bore 62 through the entire depth of the block. The bar 58 is adapted to have a pullout bolt (not shown) screwed into the bore 60 to pull the guide block out of the holder in the event of jamming of the guide block by gum or debris.

The heads of the adjustment screws 50 engage ends of adjustment screws 70, the adjustment screws 70 being locked by jam nuts 72 in positions in which the ends thereof lie in a plane parallel to the carriage guides 32. The adjustment screws 50 are adjusted to equal positions so that the face 42 extends parallel to the guides 32 and serve as stops. The adjustment screws are set initially by a master guide block (not shown) which is identical to the block 40 before the block 40 has been worn.

To resurface the face 42 of the block 40 after it is worn by use, the screws 50 are withdrawn a few number of turns, the nuts 51 are rejammed, and the block 40 is placed in a holder 80 of a carriage 82 of the surfacer 12, which has a milling cutter 84. Set screws 81 and a top plate 83 clamp the block in the desired position in which the set screws 50 engage bottom shoulder 85 of the top plate. The carriage 82 then is moved past the cutting head, which cuts a new face 42 on the block the exact desired distance from the ends of the adjustment screws 50. The carriage is guided by a dovetail guideway 87 and moved by a crank driven rack and pinion drive 89. Then the block 40 is pulled out of the holder 80 and is placed on rigid holding bars 90 on the tester 14. The bars 90 have hooks 92, which carry adjustment screws 94, which contact surface 42 of the block 40. A micrometer 96 is mounted on a slide block 98, which is supported by a slide bar 100. The micrometer 96 is moved, as desired, along the slide bar 100 to engage seriatim the ends of the two adjustment screws 50 to insure that the face 42 is parallel to the two ends and is the exact distance from the two ends that is desired. It will be understood that, to resurface the guide face of the guide block of the upper guide 22, a holder like the holder 80 but holding the guide block vertical is provided, and that a tester like the tester 14 but adapted to measure the right angle faced block of the upper guide is provided.

What is claimed is:

1. In a band saw guide,
   a holder having a guideway and stop means at one end of the guideway,
   the guideway comprising a socket open at the end thereof remote from the stop means, a saw guide block slidable in the guideway and extending out of the socket when the saw guide block is in an operating position, the saw guide block having a guide face remote from the stop means for engaging a saw band and a pair of parallel tapped bores, a pair of adjustment screws screwed into tapped bores in the saw guide block, the heads of the adjustment screws engaging the stop means when the saw guide block means is in the operating position thereof, and a pair of jam nuts on the adjustment screws and engaging the block to lock the screws in adjusted positions.

2. The band saw guide of claim 1 wherein the stop means comprises a second pair of adjustment screws adapted to be engaged by the heads of the first mentioned adjustment screws.

3. In a band saw guide, a holder having a socket and a first pair of parallel adjustment screws extending into the bottom of the socket and spaced a predetermined distance apart, a saw guide block slidable in the socket, the block having a pair of parallel tapped bores therein, and a second pair of parallel adjustment screws of equal length screwed into the tapped bores and so spaced as to engage the ends of the first pair of adjustment screws.

* * * * *

Disclaimer 3,872,762.—*William R. McKillip*, Portland, Oreg.; and *Donald L. Mason*, Fair Oaks, Calif. BAND SAW SYSTEM. Patent dated Mar. 25, 1975. Disclaimer filed Feb. 7, 1983, by the assignee, *R. Hoe & Co., Inc.*

Hereby enters this disclaimer to all claims of said patent.

[*Official Gazette April 5, 1983.*]